United States Patent [19]

Langowski

[11] Patent Number: 4,672,858

[45] Date of Patent: Jun. 16, 1987

[54] NUT/CLUTCH FOR LINEAR ACTUATOR POWER SCREW

[75] Inventor: Emil J. Langowski, Winnebago County, Ill.

[73] Assignee: Emerson Electric Co., St. Louis, Mo.

[21] Appl. No.: 788,624

[22] Filed: Oct. 17, 1985

[51] Int. Cl.⁴ ............................................. F16H 1/20
[52] U.S. Cl. ............................... 74/424.8 R; 74/459; 74/89.15; 192/150; 411/432
[58] Field of Search ................. 74/89.15, 424.8 VA, 74/424.8 C, 459, 424.8 R; 192/150, 56 R, 8 R; 411/146, 432

[56] References Cited

U.S. PATENT DOCUMENTS

| | | | |
|---|---|---|---|
| 2,834,051 | 5/1958 | Rekettye | 74/459 |
| 3,043,552 | 7/1962 | Colautti | 192/8 R |
| 3,277,736 | 10/1966 | Goodman | 74/459 |
| 3,364,757 | 1/1968 | Sears | 74/424.8 R |
| 3,559,500 | 2/1971 | Galonska et al. | 74/424.8 R |
| 3,563,106 | 2/1971 | Goodman | 74/424.8 R |
| 3,587,796 | 6/1971 | Nestvogel | 192/8 R |
| 3,703,113 | 11/1972 | Feisel | 403/344 X |
| 3,731,546 | 5/1973 | MacDonald | 74/89.15 X |

Primary Examiner—Cornelius J. Husar
Assistant Examiner—Joseph A. Fischetti
Attorney, Agent, or Firm—Polster, Polster and Lucchesi

[57] ABSTRACT

A nut/clutch assembly for a rotary power screw, such as a linear actuator power screw, is disclosed in which the power screw is selectively rotated in one direction or the other, and in which the power screw has a pair of stops spaced apart from one another and which are rotatable with the power screw. A nut is provided having a central opening threadably engageable with the power screw, and the nut is threadably movable in axial direction along the power screw upon rotation of the latter. The nut has a circumferential groove thereon, and this groove has a base and a pair of spaced side walls. A collar is slidably received within the circumferential groove, and the collar is resiliently clamped onto the nut such that the collar frictionally engages the grooved base with a desired frictional force so as to permit the nut to rotate relative to the collar upon the nut being rotatably driven by the screw, and upon the collar being held in fixed rotary position. The collar is secured to a portion of its application in such manner as to prevent rotation of the collar and so as to transmit linear force between the application and the power screw. The collar is somewhat narrower than the circumferential groove in the nut so that upon the nut moving axially along the power screw and upon the collar being coupled to the application, the collar resists axial movement of the nut and frictionally engages one of the side walls of the groove thereby to hold the nut against turning with the power screw, and further to ensure axial movement of the nut together with the collar along the power screw. When the nut engages one of the stops, the nut is positively rotated with the power screw and the collar held by the application turns relative to the nut so as to serve as a clutch.

2 Claims, 8 Drawing Figures

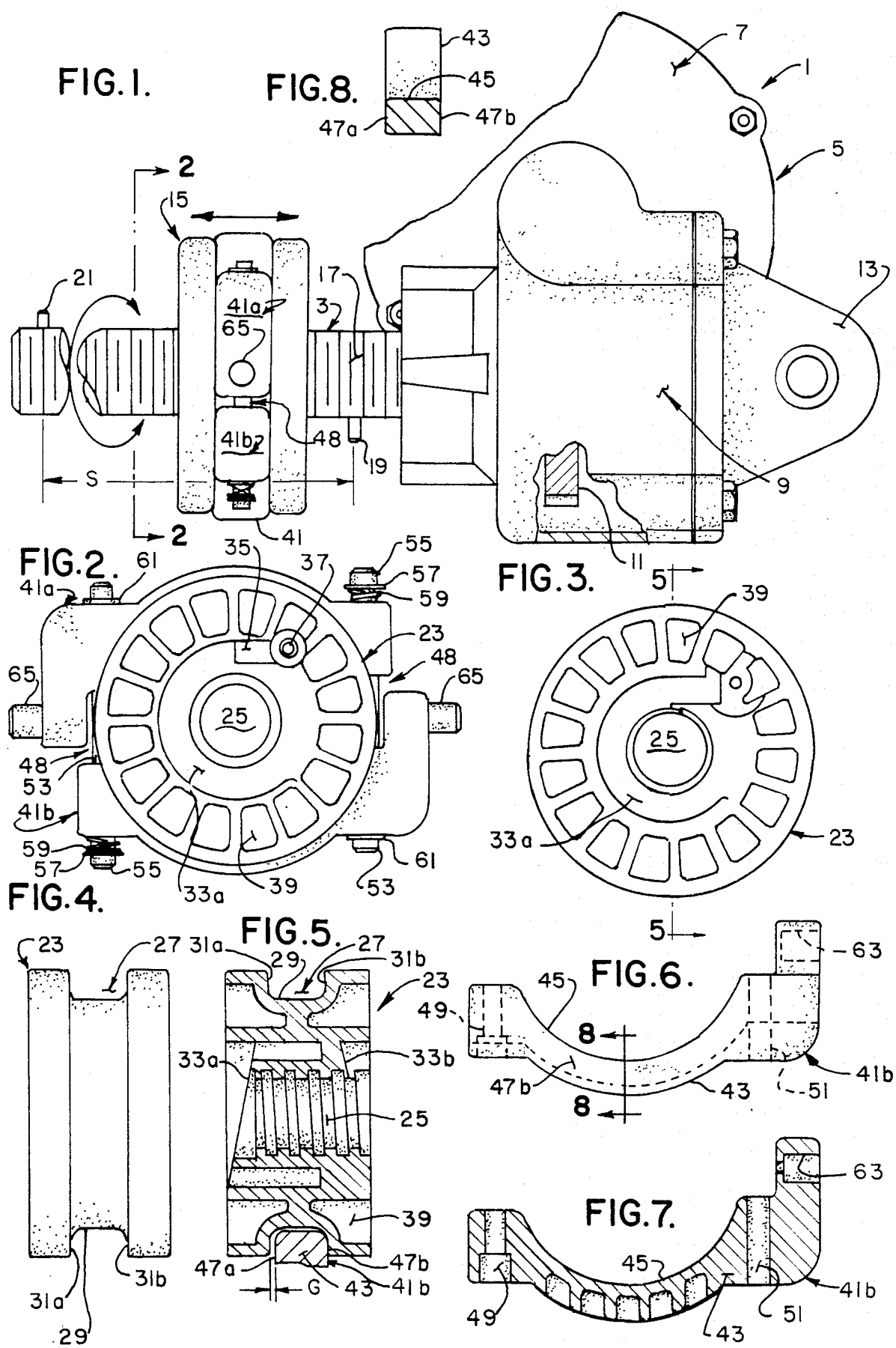

NUT/CLUTCH FOR LINEAR ACTUATOR POWER SCREW

BACKGROUND OF THE INVENTION

This invention relates to a nut/clutch assembly for a power screw, and more particularly to such a nut/clutch assembly for use with a power screw linear actuator.

Generally, linear actuators are mechanical devices that provide a linear thrust or force to move a variety of loads (often referred to as an application) either directly or through or linkages. One type of linear actuator utilizes an electric motor as the power source. Oftentimes, the electric motor output is reduced in speed via a suitable speed reducer gear box or gearhead rigidly secured to the motor. These combination motor/speed reducers are referred to as gearmotors. In certain types of electrically operated gearmotor linear actuators, the output shaft of the speed reducer drives a power screw. A nut threadably engageable by the power screw is coupled to a particular load or application so as to move a portion of the application through a predetermined distance and to apply desired force levels to the application for carrying out a desired function. Of course, linear actuators may produce almost any desired output force or be driven at virtually any speed, depending on the characteristics of the drive motor and the amount of speed reduction achieved by the gearmotor and the pitch or lead of the threads on the power screw. However, many fractional horsepower gearmotors have output speeds varying between about 60 and 200 revolutions per minute (rpm), have linear rates of travel ranging between about 8-65 inches per minute, have output torques up to 65 inch-pounds, and exert thrust (either in compression or tension) loads up to 750 pounds.

In a typical electrically driven linear actuator, such as is commercially available from the assignee of the present invention, Emerson Electric Co., under the registered trademark GEARMASTER ®, and under the trade designation A13, a power screw may typically have a synthetic resin (e.g., an acetal) or a bronze nut threaded onto the power screw. Trunnion pins or other means project outwardly from the sides of the nut so as to be coupled to an application so that the nut is forcefully driven in a direction along the rotary axis of the power screw such that a portion of the application will be forceably moved via the trunnion connection between the nut and the application.

Of course, it will be recognized that if the linear actuator continues to operate in one direction or the other, the nut threaded on the power screw will either move inwardly on the power screw until it abuts the gear housing, or until it becomes unthreaded from the free end of the power screw. One solution to control the length of the stroke of the nut along the length of the power screw is to provide a timing gear train driven by the rotor shaft, output shaft, or intermediate countershaft of the gearmotor with the timing gears operating electrical limit switches which allow the electric motor to be energized in one direction for a predetermined number of revolutions, and then to de-energize the motor, or to automatically reverse its direction of rotation. Such timing gearmotors are also commercially available from the Gearmaster Division of Emerson Electric Co., and from a variety of other manufacturers and suppliers. One such timing gear/limit switch linear actuator is illustrated in the Dayton Electric Manufacturing Co., of Chicago, Ill., installation and instruction manual for its models 4Z845 and 4Z846 linear actuators, which is included within the file wrapper of the present invention, and which is best shown on page five thereof.

While these timing gears/limit switch controls have worked well for their intended purposes, it will be appreciated that the necessity of a gear train, together with one or more microswitches for controlling operation of the gearmotor, is expensive and is relatively complicated. Also, in order to vary the length of the stroke of the nut on the linear actuator, it is necessary to change the gear ratio of the timing switch or to adjust the relative location between the actuating cam of the gear train and the limit switch. This may be done in the field, and may require the gearmotor to be at least partially disassembled (i.e., a cover must be removed from the timing gear train). Because of the requirement of such disassembly to adjust the microswitches, there is always a possibility that the gearmotor will not be properly assembled. Further, these timing gear trains and limit switches do not positively stop movement of the nut after a predetermined stroke, but rather de-energize the motor after a predetermined number of revolutions. In certain limit switch gearmotors, supplemental mechanical means are provided to positively stop the nut in the event the limit switches fail. These supplemental mechanical stop means may cause damage to the linear actuator or to its application if they are ever required to be used in that they may join the nut on the power screw or apply impaact loads to the application. In certain instances, it may be found that the actuation of the limit switch tends to drift relative to their adjusted position such that the length of the stroke may also vary over time.

As shown in U.S. Pat. No. 3,704,765, an overload clutch for a gearmotor linear actuator is disclosed. The clutch includes a first component connected to the nut which travels through a tubular sleeve. A second component extends through the tubular sleeve for the non-rotatable attachment thereof to a load. Belleville spring washers are arranged in face-to-face relation on the second component between the first and second component, the nut, and the first component so as to apply rotational restraint of the load to the traveling nut while allowing frictional resistance relative to rotation upon the traveling nut when the applied torque exceeds the frictional resistance of the compressed belleville spring washers. While this overload clutch may have worked well for its intended purposes, it did not positively limit the stroke of the linear actuator, but rather caused slippage or de-clutching action upon the applied torque to the linear actuator exceeding a predetermined amount. Thus, the stroke may vary with corresponding changes in the torque limiting characteristics of the clutch, or the torque characteristics of the application.

Reference may also be made to U.S. Pat. Nos. 3,559,500 and 3,587,796 showing linear actuators in the same general field as the present invention.

SUMMARY OF THE INVENTION

Among the several objects and features of the present invention may be noted the provision of a nut/clutch assembly for a power screw-type linear actuator or the like in which the nut is free to travel along the power screw throughout its stroke between a pair of fixed stops carried by the power screw and, when in engagement with one of the stops, the axial movement of the nut along the power screw is positively stopped without placing undue torque or axial load on the power screw or on the application connected to the nut.

The provision of such a nut/clutch which has a relatively high efficiency in transmitting linear loads from the power source rotating the power screw to the application coupled to the nut/clutch.

The provision of such a nut/clutch which permits the stroke or length of travel of the nut/clutch along the power screw to be readily and accurately controlled by varying the distance between the stop.

The provision of such a nut/clutch which will, under many normal loading conditions, hold the application in fixed relation to the power screw when the nut is stopped at any position along the power screw between the stops upon the application of a back driving force exerted by the application on the nut.

The provision of such a nut/clutch which, when the nut is in engagement with one of the stops, permits the nut to rotate with the power screw without placing undue strain on the power screw or the application attached to the nut/clutch.

The provision of such a nut/clutch which ensures that the nut will be positively driven by the power screw throughout a range of coefficients of friction between the nut and the power screw and between the nut faces and the clutch surfaces engaging the nut thereby to ensure that the nut does not slip either relative to the power shaft or to the clutch throughout its stroke The provision of such a nut/clutch which is of relatively simple and rugged construction and which has a long service life.

Other objects and features of this invention will be in part apparent and in part pointed out hereinafter.

Briefly stated, a linear actuator comprises a power screw, means for rotatably driving the power screw, means for mounting the linear actuator with respect to its application, and means driven by the power screw for converting rotary motion of the power screw into linear movement of at least a portion of the application on a line generally parallel to the axis of the power screw, and a nut/clutch of the present invention. More specifically, this nut/clutch includes a nut which is threadably engageable with power screw for lineal movement along the power screw upon rotation of the latter. The nut has a body and a central, threaded opening threadably receiving the power screw. The nut body has a circumferential groove therein, and a collar is received in this groove. The collar has means thereon for connection of the nut to the above-noted portion of the application thereby to transmit lineal forces between the nut and the portion of the application attached thereto. The power screw has at least one stop carried thereby and rotatable therewith, with this stop being engageable by the nut so as to prevent further axial movement of the nut along the power screw in one direction, and so as to positively rotate the nut with respect to the collar upon continued rotation of the power screw in the stated one direction without applying undue force on either the power screw or the application.

Alternatively stated, a combination nut/clutch assembly is disclosed for a rotary power screw, such as the power screw of a linear actuator or the like. The power screw is selectively, rotatably driven in one direction or the other, and has a pair of stops spaced from one another along the length of the power screw, with stops being rotatable with the power screw. A nut is provided having a threaded central opening which threadably engages the power screw and which is threadably movable in axial direction along the power screw. The nut has a circumferential groove thereon, with the groove having a base surface and a pair of spaced side walls. A collar is slidably received within the groove. Means is provided for resiliently clamping the collar onto the nut within the groove such that the collar frictionally engages the groove with a frictional force so as to permit the nut to rotate relative to the collar upon the nut being in engagement with one of the stops and being rotatably driven by the screw and upon the collar being held against rotation. The collar further has means for securing the collar to an application and for transmitting linear force between the application and the power screw. The collar is somewhat narrower than the groove so that upon the nut moving axially along the power screw and upon the collar being coupled to the application so as to resist the movement of the nut, the collar frictionally engages one of the side walls of the groove thereby to hold the nut against turning with the power screw and so as to ensure axial movement of the nut along the power screw.

BRIEF DESCRIPTION OF THE DRAWINGS

FIG. 1 is a side elevational view of a gearmotor driven linear actuator having a nut/clutch of the present invention threadably received on the power screw of the linear actuator;

FIG. 2 is an end elevational view of the nut/clutch assembly, as viewed along line 2—2;

FIG. 3 is a view similar to FIG. 2, illustrating the nut with a collar removed therefrom;

FIG. 4 is a side elevational view of the nut as shown in FIG. 3;

FIG. 5 is a longitudinal cross sectional view, taken along line 5—5 of FIG. 4;

FIG. 6 is a side elevational view of one of a pair of collar members which are resiliently secured together to form the collar assembly shown in FIG. 2;

FIG. 7 is a longitudinal cross sectional view of the collar body shown in FIG. 6; and FIG. 8 is a cross sectional view of a portion of the collar body taken along line 8—8 of FIG. 6.

Corresponding reference characters indicate corresponding parts throughout the several views of the drawings.

DESCRIPTION OF A PREFERRED EMBODIMENT

Referring now to the drawings, and more particularly to FIG. 1, an electric gearmotor linear actuator is indicated in its entirety by reference character 1. The linear actuator is shown to have a driven power screw 3 which is rotatably driven by means of a gearmotor assembly 5. The gearmotor includes an electric motor 7 and a speed reducer gear box 9. More specifically, speed reducer gear box 9 is shown to be a right angle worm and gear speed reducer in which the rotor shaft (not shown) of motor 7 drives a worm gear (also not shown), which in turn drives gear 11. Gear 11 is positively coupled to power screw 3 such that the power screw rotates with gear 11. A clevis fitting 13 is rigidly secured to one end of speed reducer gear box 9 so that the linear actuator 1 may be positively coupled to an application (not shown). A combination nut/clutch, as generally indicated at 15, made in accordance with the present invention, is threadably received on power screw 3 for purposes as will appear. With the exception of nut/clutch 15, linear actuator 1, as here-above described, is substantially conventional and does not, per se, constitute a part of the present invention. It will be recognized that those skilled in the art that a variety of linear actuators 1 may be utilized. One specific example of such a conventional linear actuator would be a Model A-22 linear actuator, commercially available under the registered trademark GEARMASTER ® from the Gearmaster Division, Emerson Electric Co., of McHenry, Ill. Of course, other types and brands of linear actuators may be utilized with the nut/clutch 15 of the present invention.

More specifically, power screw 15 has acme threads 17 formed thereon, running lengthwise of the power screw. A first stop pin 19 is positively affixed to the power screw generally adjacent speed reducer 9, and a second stop pin 21 is affixed to the power screw adjacent the outer end of the power screw, with the spacing between stop pin 19 and stop pin 21 being indicated by a predetermined distance or stroke S and a corresponding rotational angle, as shown in FIG. 1. It will be appreciated that the stop pins 19 and 21 are fixedly secured to and are rotatable with power screw 3 for purposes as will appear. It will be further understood that the stroke S of nut/clutch assembly 15 along power screw 3 is determined by the spacing between the stop pins 19 and 21, and that the length of this stroke may be readily varied by varying the spacing between the stop pins. While not shown herein, those skilled in the art will recognize that a series of apertures may be provided in the power screw 3 at different spacings therealong so as to receive the stop pins, and so as to permit the length of the stroke to be varied.

Referring now to FIGS. 2–8, nut/clutch 15 of the present invention is shown to comprise a one-piece nut, as indicated at 23, preferably molded of a suitable synthetic resin material, such as an acetal resin, commercially available under the registered trademark DELRIN ® from DuPont, Wilmington, Del. Nut 23 has a central, threaded opening 25 therein so as to threadably receive thread 17 on power screw 3. As shown in FIG. 4, nut 23 has an outer circumferential groove 27 extending therearound, with the groove being defined by a groove base 29 and by spaced groove side walls 31*a*, 31*b*. Each diammetric face of nut 23 has a respective stop ramp, as indicated at 33*a*, 33*b*, thereon at least partially surrounding central opening 25, with the inclination of the stop ramps generally matching the lead or pitch angle of threads 17 on power screw 3. Thus, as the nut/clutch assembly is moved axially along the power screw, one of the stops 19 or 21 (depending on the direction in which nut 23 is traveling along the power screw) comes into rotatable engagement with a respective stop or bumper 35 held in place or nut 23 by a bumper attachment screw 37. Preferably, bumper 35 is of a suitable synthetic resin material, such as a polyurethane, so that upon engagement with a respective stop pin 19 or 21, nut 23 will be forceably rotated with power screw 3 for purposes as will hereinafter appear. Within the broader aspects of this invention, it will be appreciated that stops or bumber 35 may be molded integrally in nut 23. However, by providing bumpers 35 of separate construction and of a resilient material, such as polyurethane, impact loads are cushioned and noise is damped. As indicated at 39, lightening openings are provided in both faces of the nut 23 so as to reduce the amount of resin required to mold the nut.

Further in accordance with this invention, a collar assembly, as generally indicated at 41, is resiliently received within groove 27 of nut 23. In a manner as will appear, the collar assembly 41 permits positive attachment between the nut/clutch assembly 15 of the present invention and a desired application. More specifically, collar assembly 41 is shown to comprise a pair of substantially identical collar members 41*a*, 41*b*, which are slidably received in groove 27 of nut 23.

As shown in FIGS. 6–8, each collar member 41*a*, 41*b* is substantially identical, and comprises a collar body 43 having a concave, part-circular surface 45 adapted to engage groove base 29 of nut 23. As best shown in FIG. 8, each collar body 43 has a pair of spaced collar side walls 47*a*, 47*b*, with the distance between these collar side walls being somewhat less than the distance between groove side walls 31*a*, 31*b* of nut 23. As shown in FIG. 5 on a somewhat enlarged scale, a gap G is present between one of the groove sidewalls and a collar body sidewall when the other collar body sidewall is shifted within groove 27 so as to contact the other groove sidewall.

As generally indicated at 48, means is provided for resiliently securing collar members 41*a*, 41*b* to one another, and for resiliently holding the collar members within groove 27 of nut 23, such that the part-circular surfaces 45 of each of the collar members engages the groove base 29 with a frictional force within a predetermined range, as will be hereinafter functionally described. More specifically, resilient securing means 48 comprises a counterbore opening 49 in one side of each of the collar members 41*a*, 41*b*. Likewise, an elongate aperture 51 is provided in the other side of each of the collar members such that when the collar members 41*a*, 41*b* are installed in groove 27 in the manner generally shown in FIGS. 1 and 2, the counterbore opening 41 of one of the collar members is in substantial axial alignment with the aperture 51 of the opposite collar member. Pins 53, which are inserted through apertures 49 and 51 of the diametrically opposed collar members 41*a*, 41*b*. Pin 53 has an enlarged head 55 at one end thereof with a washer 57 received on the shank of the pin and bearing against head 55. A compression coil spring 59 is interposed between washer 57 and a portion of its respective collar member 41*a*, 41*b*. With the pin inserted through apertures 49 and 51 and with spring 59 depressed a predetermined amount, a retainer 61 is affixed to the opposite end of the pin extending out beyond opening 51 in the opposite collar member so as to resiliently draw the collar members together such that surfaces 45 of the collar members frictionally engage groove base 29 with a desired force so that the collar members will have a desired frictional drag force on nut 23.

Additionally, each collar member 41*a*, 41*b* has a trunnion opening 63 in one side thereof which receives a trunnion pin 65. The trunnion pin 65 of each of the collar members extend outwardly from opposite sides of the nut/clutch assembly 15, with the trunnion pins being substantially coaxial with one another. It will be appreciated that trunnion pins 65 are utilized to attach or secure the nut/clutch assembly 15 of the present invention to a portion of a particular application such that linear actuator 1 may transmit a desired movement or force to the application via the trunnion pins.

While resilient collar assembly 41 was herein described as having two substantially identical collar members 41a, 41b resiliently held in functional engagement with groove base 29 by means of springs 59, those skilled in the art will appreciate that other resilient collar assemblies of one-piece or multiple piece construction may be used.

As those skilled in the art will recognize, linear actuator 1 may have a variety of applications. One example of such an application may be in a motorized reclining chair or the like in which a linkage (not herein shown) is secured to trunnion pins 65, and in which the clevis mounting bracket 13 of the linear actuator is affixed to a frame member (also not shown) of the chair. Upon energizing motor 7 in one direction, power screw 3 will be rotated in one direction so that nut/clutch assembly 15 of the present invention will be forcefully driven in one direction (e.g., from right to left, as shown in FIG. 1), so as to effect movement of the recliner chair from an upright position toward a reclined position, and may also effect the movement of a footrest on the recliner chair from a retracted to an extended position. Upon rotation of the motor 7 in opposite direction, the recliner chair may be returned from a reclined to an upright position.

Even more specifically, with nut/clutch assembly 15 in engagement with the first stop pin 19, and upon energization of motor 7 so as to rotate power screw 3 in such direction as to move the nut/clutch assembly 15 in one direction (i.e., from right to left, as shown in FIG. 1) away from the first stop pin 19, with clevis 13 on gearmotor 1 fixedly secured to the frame of the application (e.g., to the frame of a power-driven reclining chair), such movement of nut/clutch 15 will exert a similar (i.e., right-to-left) thrust force to be applied to the portion of the application to which trunnion pins 65 are secured. This force may be utilized to carry out any predetermined function, such as actuation of a reclining chair or the like. It will be appreciated that upon opposite energization of motor 7, power screw 3 will be rotated in opposite direction and nut/clutch 15 will be moved along power screw in the opposite direction (i.e., from left to right) until it engages stop pin 19.

Further in accordance with this invention, it will be appreciated that nut/clutch assembly 15 will only be caused to move axially along power screw 3, upon rotation of power screw 3, when nut 23 is held against rotation with the driven power screw 3. The frictional force applied by part-circular surfaces 45 of collar members 41a, 41b bearing on groove base 29 of nut 23, as pre-loaded by means of springs 59 in resilient securement means 48, exerts a sufficient resistance to turning of nut 23 with power screw 3 so as to at least initially effect axial movement of nut/clutch assembly 15 along power screw 3. Thus, it will be appreciated that with little or no load applied to trunnion pins 65, the collar body members 43 of collar members 41a, 41b will be substantially centered within groove 27 such that substantially all of the frictional force exerted between the collar body members and the rotating nut will be the engagement of part-circular surfaces 45 on groove base 29. Upon application of sufficient axial force to collar assembly 41, either resulting from initial axial movement of nut 23 relative to power shaft 3, or by a reaction force applied to trunnion pins 65 by the application, one of the side walls 47a, 47b of collar members 41a, 41b will come into face-to-face engagement with a respective side wall 31a, 31b of nut 23. In this manner, the frictional area between the collar members 41a, 41b and the nut 27 is increased approximately by the amount of one of the annular side walls 31a or 31b of groove 27. It will be further appreciated that the frictional force exerted between the nut 23 and the collar assembly 41 is directly porportional to the amount of thrust loads applied between the nut and the application via collar assembly 41.

In operation, with the nut/clutch assembly 15 moved to one end of its stroke S such that the bumper 35 on one face (e.g., the right face, as shown in FIG. 1) is in abutting engagement with its respective stop pin (e.g., stop pin 19), and with substantially little or no axial load applied to the nut/clutch 15 by means of reaction forces applied to trunnion pins 65, upon start-up of motor 7 in such direction as to drive power screw 3 so as to effect movement of the nut/clutch 15 away from gear box 9, the collar assembly 41 will be positively held against rotation by means of trunnion pins 65 being connected to the application (not shown). Upon initial rotation of power screw 3, the frictional force caused by part-circular faces 45 of collar members 41a, 41b resiliently engaging groove base 29 of nut 23 will be sufficient so as to ensure that the nut moves axially along power screw 3 at least a distance sufficient to ensure that any space between the side faces 47a, 47b of collar bodies 43 and the side walls 31a, 31b of groove 29 is taken up. In this manner, the additional friction area of collar side walls 47a, 47b bearing on a respective groove side wall 31a, 31b further ensures that nut 23 is held against rotation relative to the power screw such that trunnion pins 65 are caused to move in generally axial direction along the length of the power screw. In this manner, similar axial movement of the portion of the application attached to the trunnion pins is affected, and load is transmitted between the application and nut/clutch assembly 15. As the load increases between the application and trunnion pin 65, the sides of collar bodies 43 in engagement with the groove sides 31a, 31b will proportionally increase, thus further positively ensuring that the nut 23 is held in rotation relative to power screw 3. Thus, upon continued operation of motor 7 so as to drive power screw in the above-stated one direction, the nut/clutch 15 will continue to move axially along the power screw throughout the full length of its stroke S from the first stop pin 19 to the second stop pin 21.

As nut/clutch 15 approaches the one end of its stroke S (e.g., the left end of the stroke, as shown in FIG. 1), a stop pin (e.g., stop pin 21) rotating with power screw 3 will enter its respective stop ramp 33a, 33b and move into positive abutting engagement with its respective bumper 35. Upon engaging bumper 35, and upon continued operation of the motor 7 in the one direction, nut 23 will be positively driven via the rotating stop 21 and thus will rotate relative to collar assembly 41. In this manner, the nut and the collar assembly 15 function as a clutch upon continued rotation of the power screw 3, but will positively and accurately prevent further outward movement of the nut/clutch assembly beyond the predetermined length of its stroke S (i.e., outwardly beyond stop pin 21). In many applications, such as in a motorized recliner chair or the like, energization of motor 7 is often controlled by a normally open switch (not shown) which must be manually held in the closed position to initiate energization of motor 7 in one direction or the other. Thus, with this type of switch and motor arrangement, the nut/clutch assembly 15 will be positively stopped at the end of its stroke upon engagement with one or the other of the stop pins 19 or 21, and the nut/clutch assembly will be able to withstand, for some period of time, continued operation of the power screw without placing undue forces on either the application connected thereto, to the power screw, or to the gearmotor. Also, upon stopping the travel of the nut/clutch at any position along power screw 3 between stop pins 19 and 21 will hold the application in any such intermediate position because the force required to back drive power screw 3 is oftentimes sufficiently high as to effectively prevent back driving of the gearmotor under normal loading conditions.

Those skilled in the art will recognize that the relative dimensional relationship between the diameter of power screw 3, the diameter of nut groove 27, and the area of groove side walls 31a, 31b, together with the force with which collar members 41a, 41b are resiliently biased into engagement with groove base 29 are important so as to achieve the desired results of permitting nut 23 to rotate with power screw 3 when one of the stops 19 or 21 carried by the power screw is in positive engagement with one of the abutment bumpers 37, and yet such that when the nut is clear of stops 19 and 21 and when the power screw is driven, axial movement of the nut/clutch along the length of the power screw and transmission of forces between the power screw and the application is effected. For example, power screw 3 may be a three-quarter inch acme screw, having a major diameter of about 0.77/0.79 inch, a minor diameter of about 0.5833/0.5916 inch, a pitch of 0.1667 inch and a thread angle of about 29 degrees. Correspondingly, nut 23 may have an outer diameter of about 2.5 inches, while the diameter of groove base 29 may be about 1.99 inch. However, it should be understood that the maximum diameter of the nut and the diameter of the groove base 29 relative to the diameter of the power screw may vary considerably (e.g., plus or minus 50 percent or more of the above-stated exemplary dimensions), and that the spring forces exerted by resilient securing means 47 of the collar members 41a, 41b on the groove base may be varied accordingly so as to result in the above-stated operating characteristics.

In view of the above, it will be seen that the other objects of this invention are achieved and other advantageous results obtained.

As various changes could be made in the above constructions without departing from the scope of the invention, it is intended that all matter contained in the above description or shown in the accompanying drawing shall be interpreted as illustrative and not in a limiting sense.

What is claimed is:

1. In a linear actuator comprising a power screw, means for rotatably driving sad power screw, means for mounting said linear actuator with respect to its application, and means linearly driven by said power screw for converting said rotary motion of said power screw into linear movement of at least a portion of said application on a line generally parallel to the axis of said power screw, wherein the improvement comprises: a nut threadably engageable with said power screw for lineal movement along said power screw upon rotation of the latter, said nut having a body and a central threaded opening threadably receiving said power screw, said body having a circumferential groove, a collar received in said circumferential groove, said collar comprising two substantially similar collar members each having a part-circular surface and side wall surfaces thereon, each said collar member having a trunnion protruding from one side thereon for direct connection of said collar to said application thereby to transmit lineal forces between said nut and said application, said collar members being received in said circumferential groove on substantially opposite sides of said nut, said collar members being secured together by a pair of pins on opposite sides of said collars, with one end of each pin being secured to a respective collar member, and with the other end of each pin being slidably received in the other collar member, a spring surrounding a portion of a respective said pin for resiliently holding said part-circular surfaces of said collar members in frictional engagement with said groove base within a predetermined range of frictional forces, said power screw having a pair of spaced stops carried thereby and rotatable therewith, one of said stops being engageable by said nut so as to prevent further axial movement of said nut along said power screw in one direction and so as to rotate said nut with respect to said collar upon continued rotation of said power screw in said one direction, said nut being movable along said power screw through a predetermined stroke limited at one end of said stroke by said one stop and limited at the other end of said stroke by another of said stops, the distance between said stops corresponding generally to the length of said stroke, said other stop being engageable by said nut so as to prevent further axial movement of said nut along said power screw in the other direction therealong and so as to positively rotate said nut with respect to said collar upon continued operation of said power screw in said other direction, said circumferential groove having a base and side walls, said collar having a part-circular surface frictionally engageable with said groove base and said collar sides being frictionally engageable with said groove side walls, said collar being somewhat narrower than the distance between said groove side walls such that with said nut in engagement with one of said stops, said nut will rotate with said power screw and said collar is held against rotation by said application, and such that with said nut clear of said stop, said power screw rotates relative to said nut so as to forcefully drive said nut in one axial direction along said screw such that one of the collar sides frictionally engages a respective groove side wall thereby to frictionally hold said nut relative to said collar against rotation with said power screw, and so as to ensure that said nut and said collar, together with the portion of said application connected to said collar, move axially with respect to said power screw.

2. In a linear actuator as set forth in claim 1 wherein said nut is molded of a suitable synthetic resin, such as an acetal resin, and wherein said nut has an abutment secured thereto of a suitable synthetic resin, such as urethane.

* * * * *